United States Patent [19]

Robinson

[11] 4,424,070

[45] Jan. 3, 1984

[54] DUST COLLECTING FILTER CARTRIDGE AND ATTACHMENT STRUCTURE FOR SUSPENDING SAME FROM BAGHOUSE TUBE SHEET

[75] Inventor: James W. Robinson, Woodridge, Ill.

[73] Assignee: Flex-Kleen Corporation, Chicago, Ill.

[21] Appl. No.: 443,390

[22] Filed: Nov. 22, 1982

[51] Int. Cl.$^3$ .............................................. B01D 46/04
[52] U.S. Cl. ........................................ 55/378; 55/302; 210/323.2
[58] Field of Search ............. 55/302, 341 R, 374–379, 55/498, 502, 507, 509, 510; 210/323, 2, 451, 452; 285/239, DIG. 22

[56] References Cited

U.S. PATENT DOCUMENTS

| | | | |
|---|---|---|---|
| 4,073,632 | 2/1978 | Reinauer et al. | 55/374 |
| 4,218,227 | 8/1980 | Frey | 55/302 |
| 4,256,473 | 3/1981 | DeMartino | 55/379 |
| 4,276,069 | 6/1981 | Miller | 55/379 |
| 4,291,904 | 9/1981 | Iversen et al. | 55/378 |
| 4,292,057 | 9/1981 | Olvestad et al. | 55/379 |
| 4,319,899 | 3/1982 | Labadie | 55/302 |
| 4,322,231 | 3/1982 | Hilzendeger et al. | 55/378 |

*Primary Examiner*—David L. Lacey
*Attorney, Agent, or Firm*—Paul & Paul

[57] ABSTRACT

An attachment structure for attaching a small-diameter dust-collecting filter cartridge to the underside of a baghouse tube sheet comprises two bag cups are coaxially aligned but inverted with respect to each other. The upper bag cup has an internal flange at its upper end. The lower bag cup has an internal flange at its lower end. The other ends of the two bag cups face each other in spaced-apart relation. An external circumferential groove is provided near each of the other ends.

The internal flange of the upper bag cup is riveted to the underside of the tube sheet. The internal flange of the lower bag cup is bonded to an upper collar of the filter cartridge. A single sleeve of heavy rigid rubber material embraces the spaced-apart grooved other ends of the bag cups. The sleeve has a pair of spaced-apart annular internal beads which are received within the circumferential grooves of the two bag cups. A pair of band clamps lock the annular beads in the circumferential grooves, thereby locking the two bag cups together.

5 Claims, 1 Drawing Figure

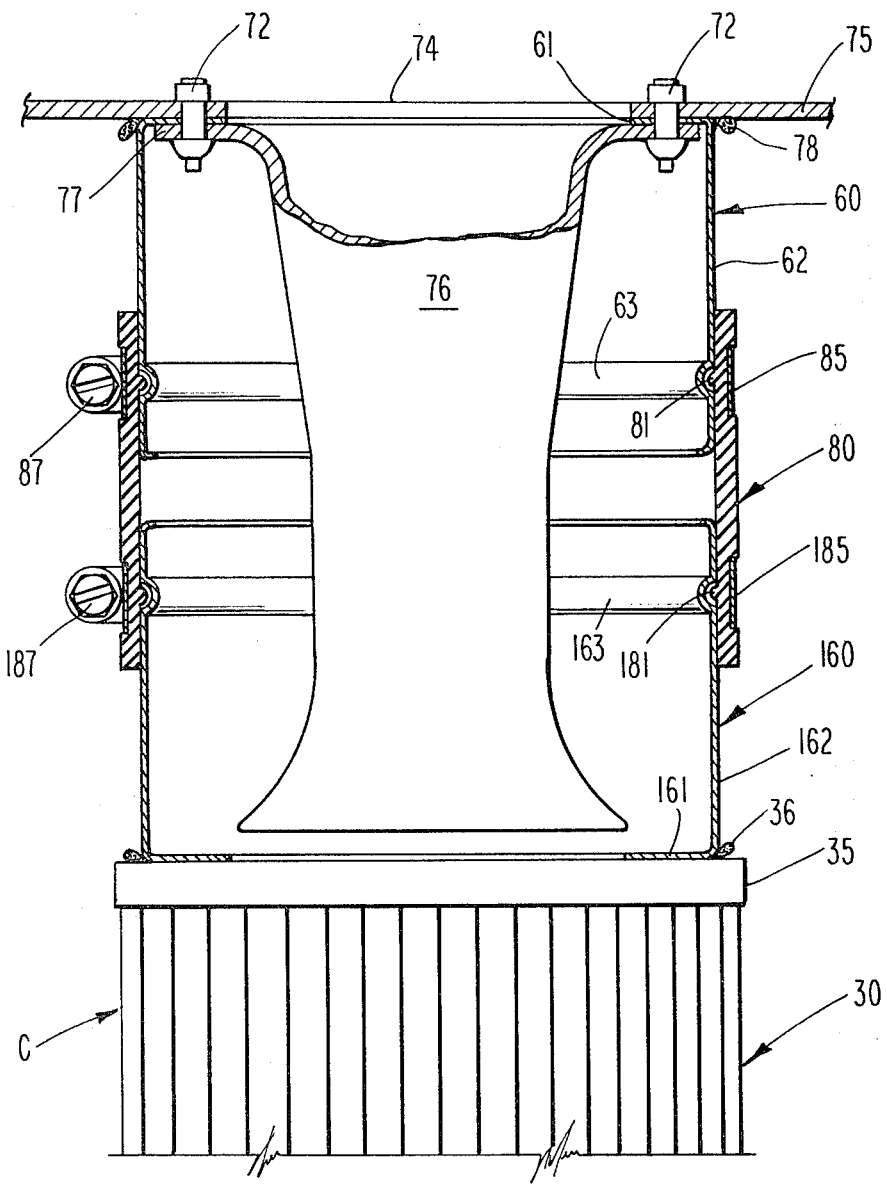

DUST COLLECTING FILTER CARTRIDGE AND ATTACHMENT STRUCTURE FOR SUSPENDING SAME FROM BAGHOUSE TUBE SHEET

BACKGROUND OF THE INVENTION

This invention relates to a filter media for apparatus for commercial or industrial use in removing particulate matter, such as dust, from a stream of gas, such as air, by cartridge filtration.

In dust filtering apparatus, a baghouse is used which, in the prior art, usually houses an array of cylindrical filter bags suspended from a tube sheet. However, in some prior art installations, an array of filter cartridges, instead of filter bags, have been used.

A dust filter bag is a tubular bag of cylindrical cross section, usually made of fabric which permits passage of air therethrough into the interior of the bag but obstructs passage of dust therethrough. The dust collects on the outer surface of the fabric and from time to time is removed, as by a blast of reverse air.

A filter cartridge, as distinguished from a filter bag, includes an inner perforated tubular sleeve or tube, usually of metal, which is surrounded by an annular filter media, usually of paper, for example, resin impregnated paper. In the prior art, the paper filter media has been pleated for the purpose of increasing the total surface area of the media and to permit the cartridge to be of shorter length than would otherwise be required.

The filter bags or filter cartridges, as the case may be, are suspended in a baghouse which is divided into two sections, a lower dust-laden air chamber, and an upper clean-air chamber. The two chambers are separated by a tube sheet having rows of spaced holes, each of which is in registry with one of the filter bags or filter cartridges. The dust-laden air is blown or drawn upwardly and passes through the wall of the filter bag or cartridge into the interior thereof. The dust does not pass through and collects on the outer surface of the fabric of the filter bag or on the outer surface of the pleated paper media of the cartridge. The dust-free air continues on, upwardly through the open mouths of the bags or cartridges through the holes in the tube sheet and into the upper or clean-air chamber.

Over a period of time, the collection of dust on the outer surface of the bag or cartridge, unless removed, would impede, and eventually prevent, flow of air through the wall and into the interior of the filter bag or cartridge.

The prior art has provided methods for removing the accumulation of dust from the outer wall. Pressurized air is blown in a reverse direction through the bag or cartridge. This is done by injecting a blast of air under pressure into the mouth of the bag to cause it to flow downwardly and outwardly through the fabric or paper wall, thereby to dislodge the dust accumulated on the outer surface of the wall and cause it to fall into a receptacle at the bottom of the lower chamber of the baghouse. A venturi is used to amplify the reverse air.

The prior art has also provided a pneumatic pulse jet system which provides continuous automatic cleaning of the baghouse but cleans only one row of bags or cartridge at a time. Using a timed cycle, a burst of compressed air is directed down through the venturi at the top of each bag in a single row. This induces clean air into the bag setting up a pneumatic shock wave inside. The air flow upwardly through the bag is momentarily stopped and the bag is flexed outwardly, causing accumulated dust particles to drop off into the collector hopper. Since only one row of bags is subjected to the blast of compressed air at a time, there is no interruption of air flow upwardly through the other filter bags or cartridges. This system provides a smooth operating dust control or material handling system.

Prior art filter cartridge systems have been capable of filtering relatively small concentrations of dust or fumes from slow moving air stream, but have not been capable of filtering large concentrations of dust from fast moving air streams. The reason for the inability of the prior art filter cartridge system to handle fast moving air streams carrying large concentrations of dust is the fact that the prior art system has used large diameter cartridge elements having a large number of deep closely-spaced pleats forming a large number of small-angled dust-collecting pockets. The dust becomes so lodged in the deep small-angle pockets that it cannot be effectively removed by the reverse jet air blast. This reduces the effective area of the filter media and has forced the prior art cartridges to have large areas of filter media for each cartridge element. Such large filter elements, when laden with dust become heavy and filter element replacement is made more difficult.

The efficiency and effectiveness of the filter cartridge can be increased by using a cartridge of relatively small diameter with filter media having a relatively small number of pleats of relatively short length, but substantially wider dust angles.

An important advantage of the small-diameter filter cartridge is that it may be installed in existing baghouses to replace the closely spaced filter bags now contained in such baghouses. As described previously herein, a typical filter bag has a diameter of about six inches. In contrast thereto, many prior art filter cartridge have an outside diameter of the order of twelve inches and thus cannot be used to replace filter bags in existing baghouses. Such baghouses may have as many as 500 filter bags in closely spaced rows and, it is an important practical advantage to be able to replace each small-diameter filter bag with a filter cartridge without having to replace the tube sheet.

The present application describes and claims mechanical attachment structure adapted for installing the small-diameter filter cartridge in baghouses, including existing baghouses in which the filter elements are closely spaced filter bags.

As used in the claims, the term "small-diameter filter cartridge" means a filter cartridge having a diameter of the order of six inches or less.

BRIEF DESCRIPTION OF THE DRAWING

The single FIGURE of drawing is an elevational view showing the attachment structure for suspending the small-diameter filter cartridge from the tube sheet for installation and removal by the maintenance man working in the lower chamber of the baghouse.

DETAILED DESCRIPTION OF THE PREFERRED EMBODIMENT

Referring now to the drawing, an upper cylindrical bag cup 60 having an inward annular flange 61 is secured, as by rivets 72, to the undersurface of a tube sheet 75 in registry with a hole 74 of the tube sheet. Also suspended from the undersurface of tube sheet 75 by the rivets 72, and also in registry with tube sheet hole 74, is a venturi nozzle 76 having an outward annular flange 77 through which the rivets 72 pass to secure both the venturi nozzle 76 and the upper bag cup 60 to the tube sheet. A sealant material 78, placed between the inward flange 61 of the bag cup and the undersurface of the tube sheet 75, functions as a dust-tight sealing material. Bag cup 60 has a vertical cylindrical wall 62 having therein an annular groove 63 closer to its lowermost end.

A small-diameter filter cartridge C, having an annular pleated filter media 30, is provided at its upper end with an annular metal collar 35. Supported on metal collar 35 is a second or lower bag cup 160. Lower bag cup 160 is identical to upper bag cup 60 except that it is inverted relative thereto with the inward annular flange 161 of the lower bag cup resting on and bonded to collar 35 of the filter cartridge C with adhesive sealant 36. Like the upper bag cup 60, the lower bag cup 160 is provided with an annular groove 163 in its vertical wall 162.

In a single FIGURE of drawing, the filter cartridge C is shown fully installed. In this position, a sleeve 80 of heavy rigid rubber material embraces the lower portion of the upper bag cup 60 and the upper portion of the lower bag cup 160. The inner wall of the rubber sleeve 80 is provided with upper and lower detents in the form of upper and lower annular beads 81 and 181. Beads 81 and 181 are adapted to snap into the annular grooves 63 and 163, respectively. An upper metal band clamp 85 embraces sleeve 80 at the level of the groove 63, and is tightened by screw 87. A lower metal band clamp 185 embraces the lower portion of sleeve 80 at the level of groove 163, and is tightened by screw 187.

During installation and removal of filter cartridge C, the upper bag cup 60 and the venturi nozzle 76 are not disturbed. These elements remain riveted to tube sheet 75. The upper band clamp 85 remains tightened and is not disturbed during installation and removal of the filter cartridge C.

To install the filter cartridge C, the maintenance man pushes the bag cup 160, to which the filter cartridge is attached, up into the heavy rubber sleeve 80. The fit is a reasonably tight sliding fit. When the groove 163 reaches the bead 181, the bead snaps into the groove, thereby latching the bag cup 160 and filter cartridge C to the upper bag cup 60. The metal band clamp 185 is then tightened to assure the latch.

To remove the filter cartridge C, the band clamp 185 is loosened. Then the maintenance man pulls down on the bag cup 160 causing the curved surface of the groove 163 to cam outwardly the bead 181 and the lower end of the resilient sleeve 80. This dislodges the detent or bead 181 from the groove 181 and releases the bag cup 160 and filter cartridge C.

What is claimed is:

1. A combination of:
A. a baghouse tube sheet having a plurality of holes therein;
B. a small-diameter filter cartridge, said cartridge having a metal collar at its upper end; and
C. attachment structure for suspending said filter cartridge from said baghouse tube sheet, said attachment structure comprising:
  a. a first cylindrical bag cup having an annular flange and a vertical sidewall having an annular external groove therein;
  b. means securing said annular flange of said first bag cup to the under surface of said tube sheet for suspending said bag cup from said tube sheet in registry with one of the holes therein;
  c. a second cylindrical bag cup having an annular flange and a vertical sidewall having an annular external groove therein,
  d. means securing said annular flange of said second bag cup to upper end of said filter cartridge;
  e. a tubular sleeve embracing the lower portion of said first bag cup which includes said annular groove, said sleeve having an internal annular bead forming an upper detent positioned within the annular groove of said first bag cup, said sleeve extending downwardly beyond the lower end of said first bag cup, said sleeve extension having an internal annular bead forming a lower detent positioned within the annular groove of said second bag cup,
  f. said second bag cup with said filter cartridge secured thereto being pushed upwardly into the extension portion of said sleeve to cause said lower detent to be received within the annular groove of said second bag cup;
  g. a first clamp embracing said sleeve at the level of said upper detent; and
  h. a second clamp embracing said sleeve extension at the level of said lower detent.

2. The combination according to claim 1 wherein a venturi nozzle is suspended from said tube sheet in such position as to extend downwardly into said first and second bag cups.

3. The combination according to claim 1 wherein said sleeve is of heavy rubber material.

4. The combination according to claim 1 wherein said means for securing said annular flange of said second bag cup to the upper end of said filter cartridge is an adhesive sealant.

5. The combination according to claim 1 wherein said sleeve is of heavy rubber material and wherein said means for securing said annular flange of said second bag cup to the upper end of said filter cartridge is an adhesive sealant.

* * * * *